United States Patent [19]

Kuehnle

[11] Patent Number: 5,552,817
[45] Date of Patent: Sep. 3, 1996

[54] ELECTROTHERMAL PRINTING INK WITH MONODISPERSED SYNTHETIC PIGMENT PARTICLES AND METHOD AND APPARATUS FOR ELECTRONIC PRINTING THEREWITH

[76] Inventor: Manfred R. Kuehnle, Waldesruh P.O. Box 1020 Rte. 103A, New London, N.H. 03257

[21] Appl. No.: 397,746

[22] Filed: Mar. 2, 1995

Related U.S. Application Data

[62] Division of Ser. No. 166,098, Dec. 13, 1993, Pat. No. 5,406,314.

[51] Int. Cl.⁶ ............................ B41J 2/385; G03G 15/01; G01D 15/06
[52] U.S. Cl. ............................................................. 347/115
[58] Field of Search ............................ 347/115; 355/213; 430/48

[56] References Cited

U.S. PATENT DOCUMENTS

| | | | |
|---|---|---|---|
| 3,893,761 | 7/1975 | Buchan et al. | 355/272 |
| 4,792,860 | 12/1988 | Kuehrle | 347/115 |
| 5,340,679 | 8/1994 | Badesha et al. | 430/126 |
| 5,344,489 | 6/1994 | Matijevic | 106/442 |
| 5,406,314 | 4/1995 | Kuehnle | 347/115 |

FOREIGN PATENT DOCUMENTS

| | | | |
|---|---|---|---|
| 47-25389 | 7/1972 | Japan | 430/48 |
| 0038957 | 3/1983 | Japan | 430/48 |
| 0068045 | 4/1983 | Japan | 430/48 |
| 00680444 | 4/1983 | Japan | 430/48 |
| 389486 | 7/1973 | U.S.S.R. | 430/48 |
| 0913321 | 3/1982 | U.S.S.R. | 430/48 |

Primary Examiner—Benjamin R. Fuller
Assistant Examiner—Raquel Yvette Gordon
Attorney, Agent, or Firm—Cesari and McKenna

[57] ABSTRACT

A printing ink comprises a clear, transparent, polymeric carrier material and uniform, colloidal size charged color particles evenly dispersed therein. The carrier and the particles are adhesively bonded to one another so as to form a matrix which can collectively respond to an externally imposed electrostatic field to promote co-movement of a "bite" of ink to an imaging medium without change of the bulk particle/carrier ratio. During the printing process, the ink is melted and exposed to electrostatically charged latent image areas on a heated image cylinder, resulting in the transfer of the ink thereto in proportion to the electrostatic field strength. The ink exhibits a relatively sharp liquid-to-solid transition, thereby enabling rapid ink solidification and complete transfer from the imaging medium to the relatively cool printing substrate. Also disclosed is a printing method and apparatus that facilitate continuous, variable and on-demand color printing in conjunction with the ink. Use of essentially monodispersed, color-coated, colloidal size, spherical particles in the ink results in excellent color purity and chromaticity range.

14 Claims, 7 Drawing Sheets

X151

STRAIGHT ARRAY OF DOTS

DITHERED ARRAY OF DOTS

SUPERIMPOSED COLOR INK DOTS

ELECTROTHERMAL PRINTING INK WITH MONODISPERSED SYNTHETIC PIGMENT PARTICLES AND METHOD AND APPARATUS FOR ELECTRONIC PRINTING THEREWITH

This application is a division of application No. 08/166,098, filed Dec. 13, 1993, U.S. Pat. No. 5,406,314.

BACKGROUND OF TEE INVENTION

A. Field of the Invention

This invention relates generally to electrothermal printing, and more particularly to an improved printing ink to mark substrates such as paper, as well as apparatus and methods for use therewith.

B. Description of the Related Art

Traditional methods of printing utilize various types of long-run print forms such as gravure cylinders, offset plates or flexographic belts which carry a representation of the desired image (the so-called "signature") suitably recorded thereon. The print form is matched with a particular type of ink having physical characteristics compatible with those of the print form, thereby facilitating cycles of proper ink uptake and ink release. For example, in gravure printing, the gravure cylinder contains an imagewise pattern of depressions, so-called "cells", that accept ink from an ink-feed roller and subsequently deposit part of the ink under immense mechanical pressure onto a printing substrate (such as paper). This process generally requires low-viscosity inks having high solvent contents in order to promote the ready release of the ink from the gravure cells, even though large residual volumes of the ink will remain in the cells after these are pressed onto the print paper.

Lithographic offset printing, another much-used process, generally involves aluminum plates having imagewise signatures recorded thereon, the signatures residing in rasterized ink-accepting and ink-repellent areas comprising millions of print dots. In contrast to gravure systems, whether a given plate area will accept or repel ink is determined by its planar oleophobic and/or oleophilic surface characteristics rather than by the presence of cells. A lithographic offset plate is usually "imaged" by means of ultraviolet contact photography with a sheet of silver film; this process permits subsequent etching of the exposed plate raster-dot areas from an initial ink-accepting state into a water-accepting state, while leaving the unexposed dot areas in their original ink-accepting state. Lithographic inks are hydrophobic, and exhibit high, paste-like viscosities and contain relatively small amounts of solvent.

The primary disadvantages of these traditional printing methods stem from the tediousness and time-consuming lengthiness of recording the precise signature needed on the print member, and the inability to alter the imaged print member. Indeed, the print member is always discarded after its use. Due to the unalterable nature of the signature, the print form can only function repetitively; that is, it must print thousands of the same image signature in succession for later collation, cutting, and binding. Thus, the instantaneous variability of printed signatures, such as ascending page numbers, is impossible with traditional print forms, making short runs such as 100–1,000 prints quite uneconomical; this is particularly so when the long make-ready time for the press is considered. Furthermore, because traditional print methods require significant contact pressures between print form and printing substrate, the presses must be sturdy, precise and, consequently, very heavy and costly.

In order to avoid at least some of these difficulties, practitioners have developed alternative printing processes generally called "marking" methods. Ink-jet equipment, for example, completely eliminates the need for any print form, producing color images by ballistically jetting a serial sequence of ink droplets from a distance onto specially prepared paper (See, e.g., U.S. Pat. No. 4,593,292). The ink, which is generally volatile and low in viscosity, is usually furnished in liquid form, but sometimes it is provided in a solid form. The ink block is heated to fill a chamber from which a liquid droplet is subsequently ejected through a nozzle by means of a piezoelectric actuator; the droplet travels onto the paper where it impacts, loses its remaining heat and affixes. This process is relatively slow in terms of print speed, requires specially constructed paper substrates, is severly limited in terms of resolution, and lacks dot-by-dot gray-scale tonal capability. Furthermore, the resulting image typically remains entirely on top of the paper substrate in relief, and is thus susceptible to scratching and other physical damage unless solvent-based inks are used; these penetrate the paper to such a depth that the ink appears at the back of the paper.

Another alternative to traditional print-form-based printing is the thermal electrostatic method (See, e.g., U.S. Pat. No. 3,079,272 and British Patent No. 953,077). In this process, a discharge source deposits imagewise electrostatic charges onto a photoconductive plate or drum. The plate or drum is then brought into contact with a solid wax block, which consists of a carrier material in which electrostatic toner particles are dispersed. Heat or a solvent is applied to the block at the line of contact with the printing substrate, bringing the carrier into a molten state within which the charged particles can move freely. As the block is drawn along the substrate, it wets the entire surface with the wax; however, when the block reaches latent electrostatically charged image areas, the toner particles are slowly drawn onto the substrate by electrophoresis.

Once again, the need for a permanent print form is eliminated, in this case because of the ease with which a latent image pattern can be deposited onto an image cylinder or on the substrate itself. If the electrical resistivity of the toner is sufficiently high and the substrate carrier possesses good charge-retention characteristics, a single charge deposition can be re-used to produce a number of printed images; toners having low resistivity tend to dissipate the charged image areas by conduction.

The solid toners used in the above process consist of a carrier, such as wax, in which toner particles are dispersed. Thus, the carrier merely serves as a reservoir from which toner particles are continuously extracted during use, causing ultimate depletion of the reservoir. Because of the slowness of the electrophoretic process, the steady and non-uniform depletion of the reservoir, and the overall wax deposit on the entire image sheet, this process is considered impractical and therefore not used in commercial products.

DESCRIPTION OF THE INVENTION

A. Brief Summary of the Invention

The present invention overcomes the limitations of both the traditional printing processes and the more exotic marking methods by providing a printing system wherein the print form can be varied continuously and can be reused; wherein the densities of the individual ink dots can be varied and deposited on a variable image member (e.g., a print or image cylinder) in fixed ratios of particles to carrier medium without depletion of the reservoir; and wherein the ink deposited on the image cylinder is released in toto upon contact with the primary substrate, thus allowing the immediate reuse of the image cylinder for the recording of an entirely new, subsequent signature.

The present advance is made possible by combining several correlated novel printing features including the particular ink described herein, the image-member construction, the signature-recording method and means, the ink-deposition subsystem, and the method of ink release to the primary substrate. Obviously, the ink and its functional characteristics are central to this printing process.

Thus, in accordance with the present invention, the printing ink initially takes the form of a meltable, solid block of carrier material that contains myriad, tiny, preferably monodispersed, colored pigment particles distributed evenly in the solid carrier material. These particles exhibit an innate electrical potential in relation to the carrier material so as to become responsive to and be attracted by external electrostatic fields. The carrier medium consists of a polymer containing electrostatically polarizable subagents which are capable of interacting with such fields, thus forming a field-responsive matrix. The index of refraction of the particles closely matches that of the carrier, so that when an image is printed with this ink it exhibits maximum color transparency and saturation in a selected color band after the ink resolidifies.

Accordingly, the first important feature of the invention resides in the ability of the ink to respond as an integrated particle/carrier matrix to an externally imposed field, thus enabling the deposition of a field-intensity-proportional quantity of the ink on the field source area itself. Because of the responsive nature of the ink matrix, a fixed, specific mass ratio between the colored particles and the carrier material is always maintained regardless of whether the ink is in solid, liquid or resolidified-droplet phase. In this way, consistent optical density properties can be achieved upon deposition and later solidification of the released ink on the printing substrate, and the problem of uneven toner-particle depletion is eliminated.

The second important feature of the invention is the degree of transparency and purity of color this ink produces upon release in a liquid state from an image member (e.g., a print or image cylinder) onto a printing substrate such as paper. Because of the matched, identical indices of refraction of both the particles and the carrier material as well as the minute size of the particles, the ink attains near-perfect transmissivity for all light frequencies not absorbed by the chemistry of the particles. The purity and lack of grayness (noise) of the transmitted color derives also from the wave propagation and controlled light-scatter between multiple layers of uniformly dispersed particles. Because all particles are identical in shape (preferably spherical), size (approximately 0.1 µm), and chemistry (including selected color dyes at the outer shell of the particles), and are embedded in a clear carrier of equal refractive index, the transmitted light remains pure and of great brightness as predicted by the well-known Mie light-scattering theory.

The third important feature of the invention involves the complete transfer of the deposited ink from the image cylinder surface to the printing substrate. This is facilitated by utilizing an image cylinder whose surface is ultra-smooth and basically phobic to the molten polymer ink. However, when those areas where electrostatic fields have attracted (and which therefore hold) hot, molten ink droplets come in contact with the cool printing substrate, these droplets immediately, as a liquid, begin to penetrate the substrate surface while losing the small amount of heat energy contained in the ink droplet (typically about 50 µm×50 µm×2 µin volume). The result is rapid solidification of the ink while it fuses itself onto the substrate like hardening glue. With a relatively firm bond established with the substrate, the ink droplets, still liquid at the point of contact with the heated image cylinder, are pulled completely from from the cylinder surface as the ink adhesion force from the substrate overpowers the adhesion force from the cylinder; because of the strong internal cohesion in the ink droplets, this transfer is complete, leaving no residue of ink or even electrostatic charge on the cylinder.

The printing ink of the present invention is preferably supplied as a solid block of thermoplastic carrier material containing therein the colored-particles in even distribution. When heated, the viscosity of the carrier material preferably drops sharply to a low-viscosity condition (e.g., approximately that of a thin oil such as turpentine), thereby dramatically reducing the cohesion forces of the carrier material, while allowing the polarizable portion of the molecular structure of the carrier to become oriented along the electrostatic field lines that impinge from the outside and, in turn, assisting thereby the reorientation of the charge displacement on each particle to comply with the polar orientation of the external field.

Because of the polarizable nature of the carrier and the charge on the particles, the liquefied ink responds to externally applied electrostatic fields, and thereby enables the image cylinder to take a "bite" out of the molten ink supply through the action of the forces projecting from the print-dot-sized electrostatic field domains into the molten, liquid ink supply, which overpowers the internal cohesion forces of the ink.

The image member used in conjunction with the ink of the present invention is preferably an image cylinder that can be heated to a precise temperature and which is capable of maintaining that temperature. The cylinder carries imagewise electrostatic field areas (print dots) which collectively form a latent image (signature). As the ink-supply and image cylinders rotate in intimate surface contact with one another, the charged areas on the image cylinder attract a field-strength-proportionate amount of dielectric ink whose volume (i.e., thickness) thereon is determined by the point of field neutralization (depth penetration) within the ink supply. The ink particles remain bound to the liquid carrier by a matrix of interacting electrostatic forces, and they transfer to the image cylinder with a fixed ratio of particles to carrier material in each "bite." In other words, the ink that adheres to the electrostatically charged areas of the cylinder will ultimately print at a selected optical color transmission density, this density being determined by the field intensities emanating from those charged areas. However, while the field strength controls the thickness of ink on the deposited dots, their areas of coverage are controlled only by the geometry of the charged dot areas on the image cylinder. Consequently, a variation of the field intensities on the image cylinder facilitates reproduction of a full gray scale using the ink of the present invention comparable to that attained with photographic film.

The so-called contact angle of a hot, liquid ink drop at the boundary where it touches the hot cylinder surface must accommodate the choice of polymer carrier material and the ionic potential of said surface material. In the present invention, a contact angle of 90° is utilized to prevent uncharged areas of the image cylinder from becoming wetted by the ink. In order to attain the desired contact angle and assure non-wettability of the image cylinder, the phobicity to ink of the cylinder surface can be assisted and controlled by implanting ions into said surface material. For example, the addition of miniscule amounts of fluorocarbon will assure a contact angle of 90°, and thereby prevent both wetting in non-charged areas and spreading of the ink from charged areas.

When the ink residing on the relatively hot (about 150° C.) image cylinder is brought into contact with a cool (about 20° C.) substrate (e.g., printing paper), the ink droplets solidify rapidly as they penetrate the surface (and not the bulk) of the substrate. At this point the temperatures of the droplets span a gradient from 20° C. to 150° C. across their thicknesses (about 2 μm) where the low-temperature side is solid and the high-temperature side is still liquid. Cooling of the ink droplets also increases their internal cohesion, resulting in the departure of each droplet in its entirety from the image cylinder as forces of adhesion to the printing substrate, combine with internal cohesion forces to overpower the forces of adhesion to the image cylinder.

The inks of the present invention can be remelted, at least in part, although already affixed to the printing substrate to allow the bonding of successive color ink deposits on top of each other for total color adjustment. This property allows printing of a wide variety of color hues, which are achieved by hot superimposition of multiple, geometrically congruent dots of different subtractive, highly transparent colors; the hue ultimately obtained is determined by the chosen colors and the densities of each of the overprinted dots.

The ability to remelt the inks further facilitates their ultimate removal from the printing substrate (de-inking). Such removal can be accomplished by running a hot roller over the printed material while applying a strong electrostatic field in the reverse direction and with said roller having a strongly oleophilic surface.

B. BRIEF DESCRIPTION OF THE DRAWINGS

The foregoing discussion will be understood more readily from the following detailed description of the invention, when taken in conjunction with the accompanying drawings, in which.

Figure 3:
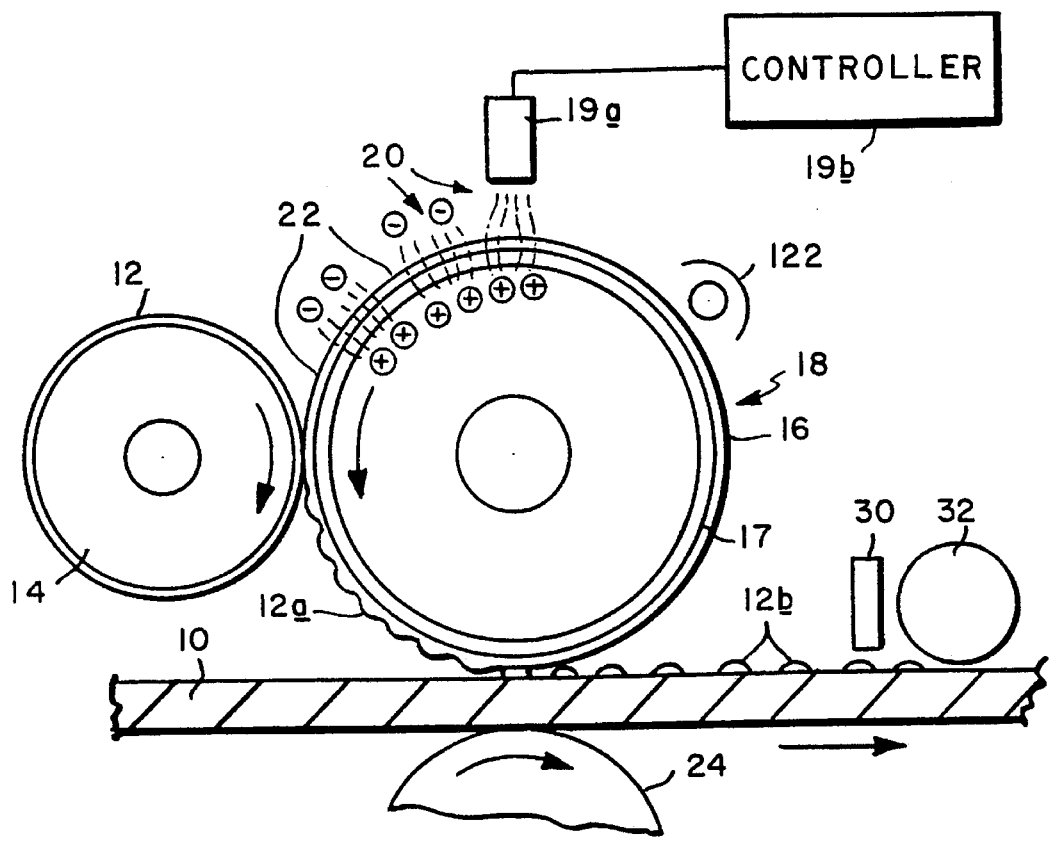
FIG. 3 is a schematic representation of a printing apparatus employing the electrothermal properties of the ink of the present invention, as well as the method of recording a print signature, depositing an amount of ink proportional to the field strengths of each dot, and releasing said ink onto a cool substrate for complete fusion thereon.
Figure 6A:
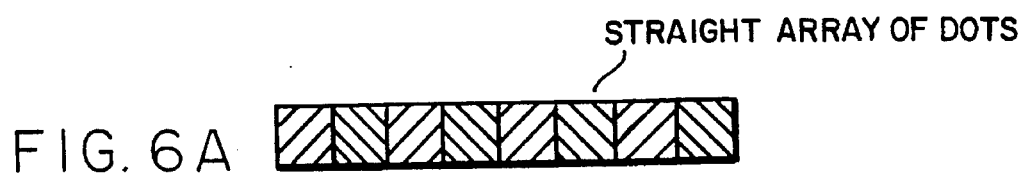
Figure 6B:
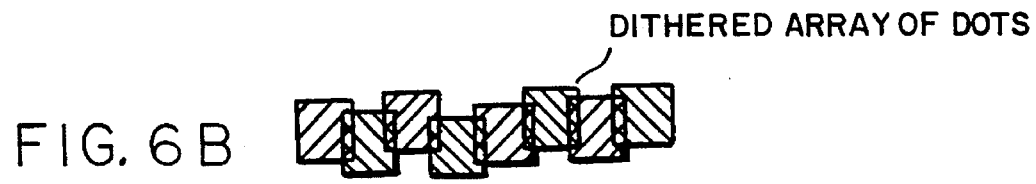
Figure 6C:
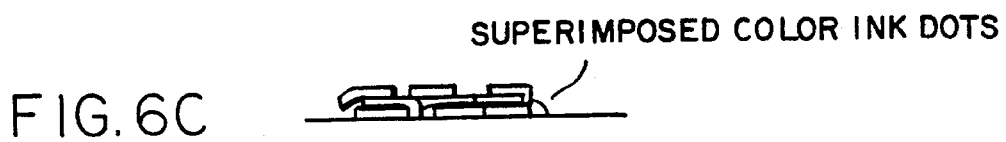
Figure 4:
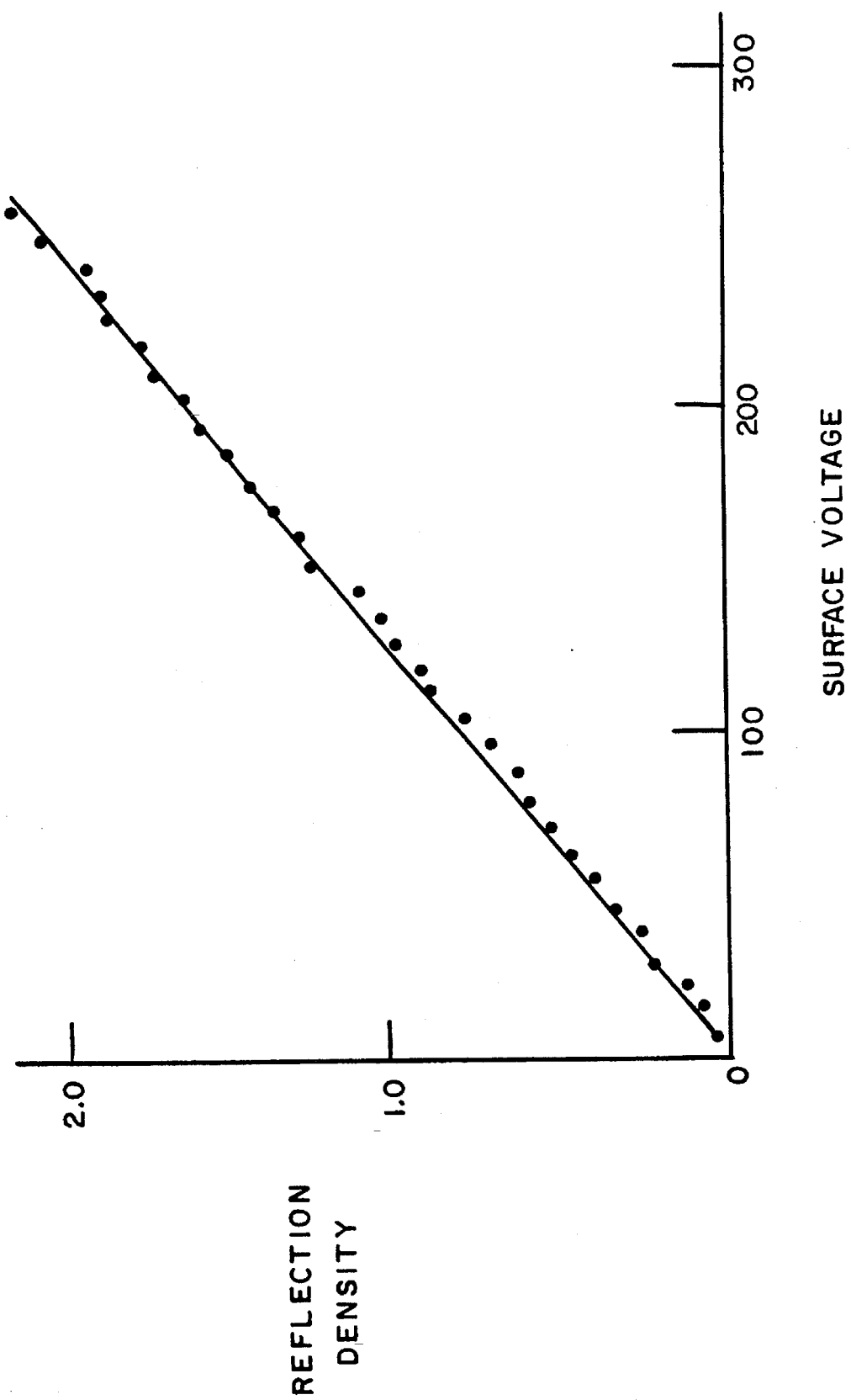
Figure 5A:
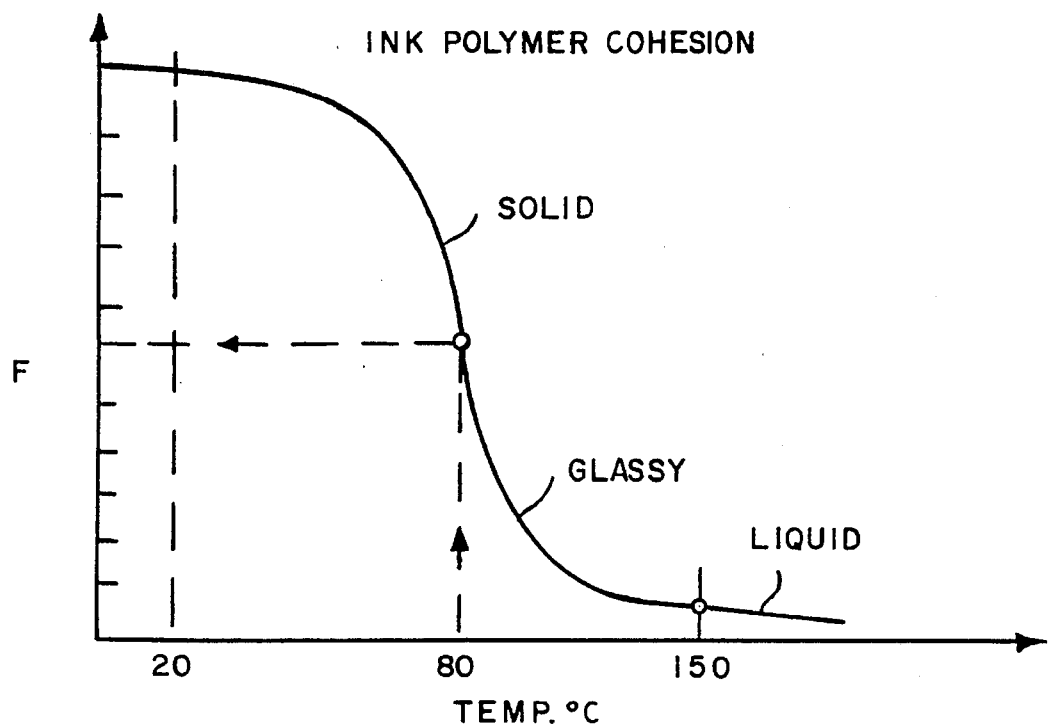
Figure 5B:
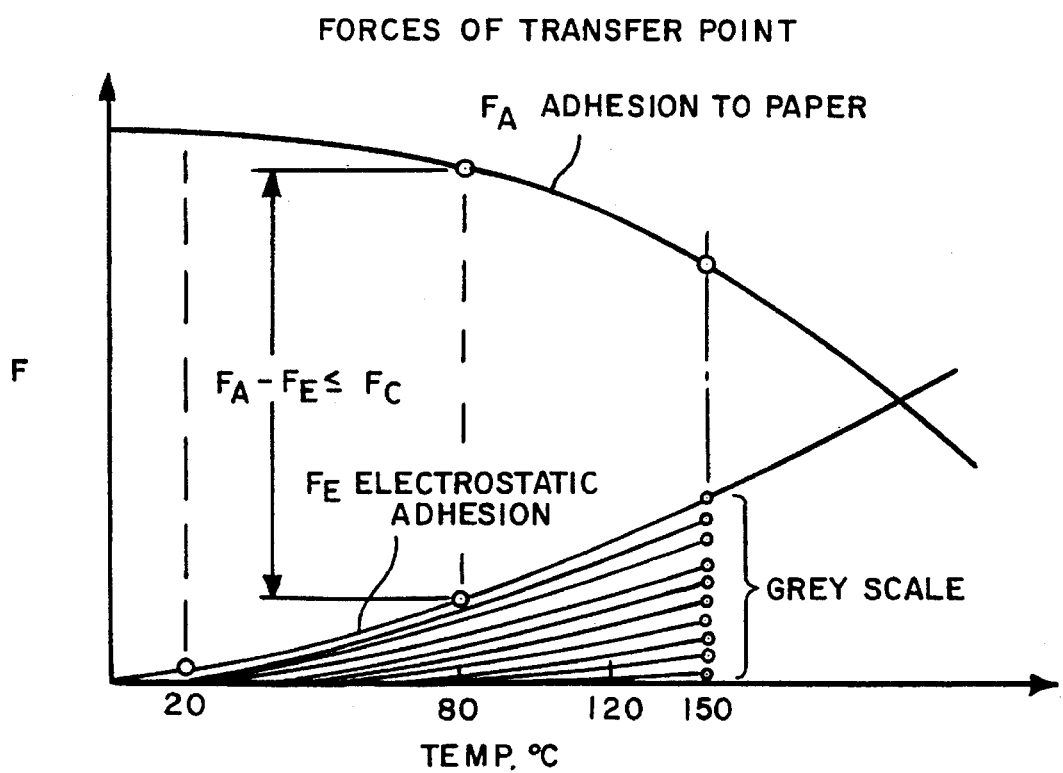
Figure 7:
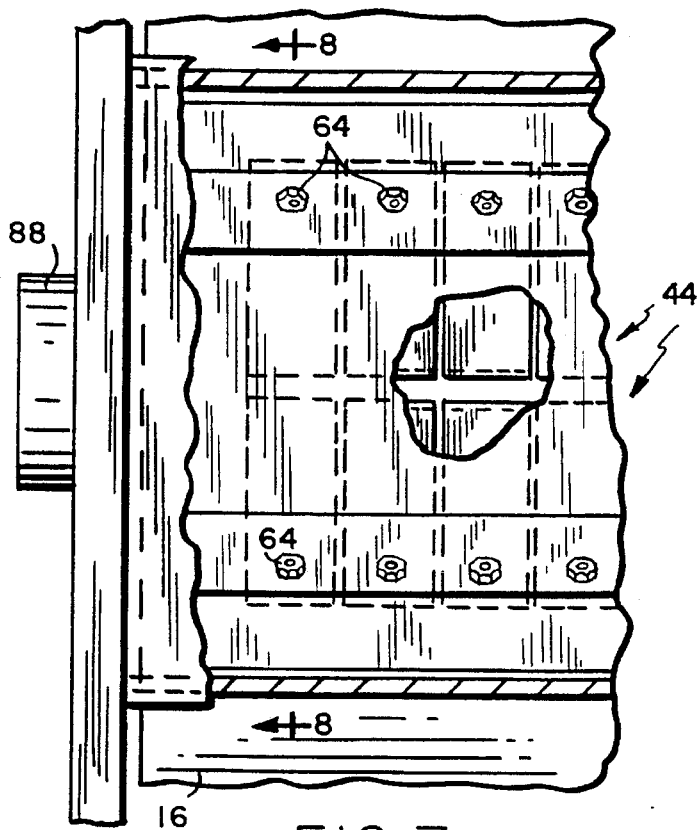
Figure 8:
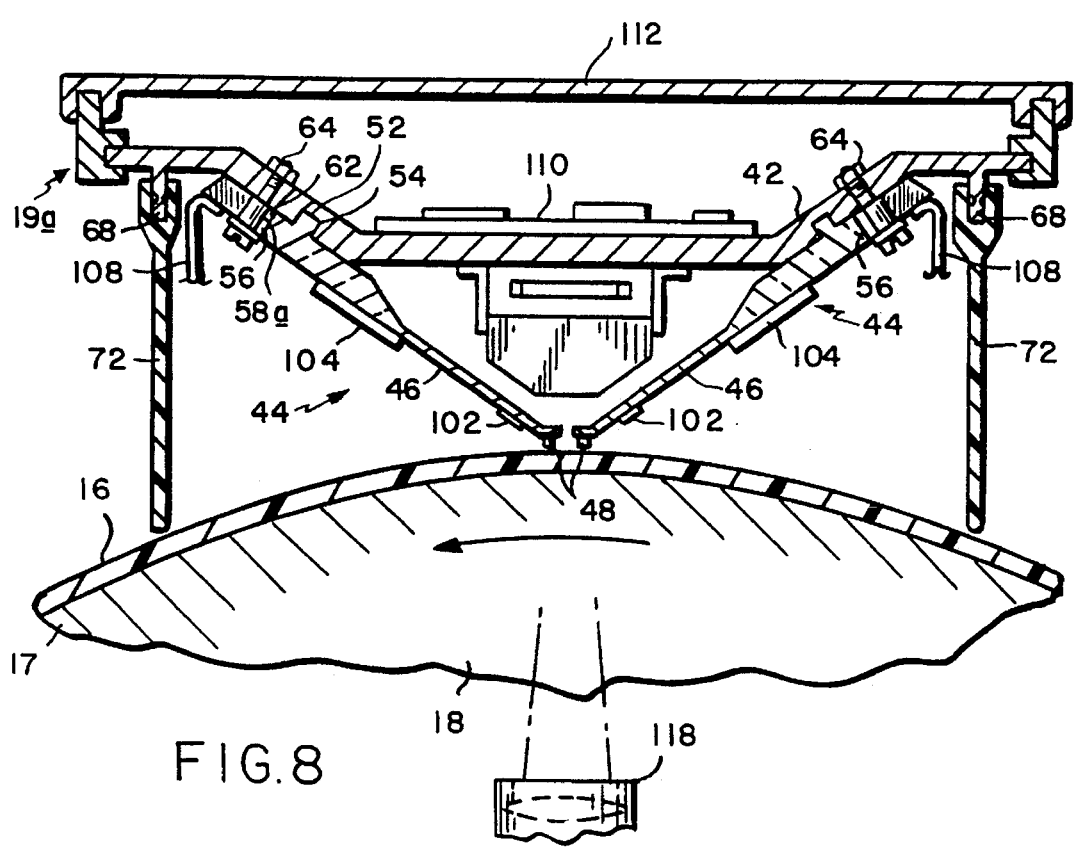
Figures 9, 10:
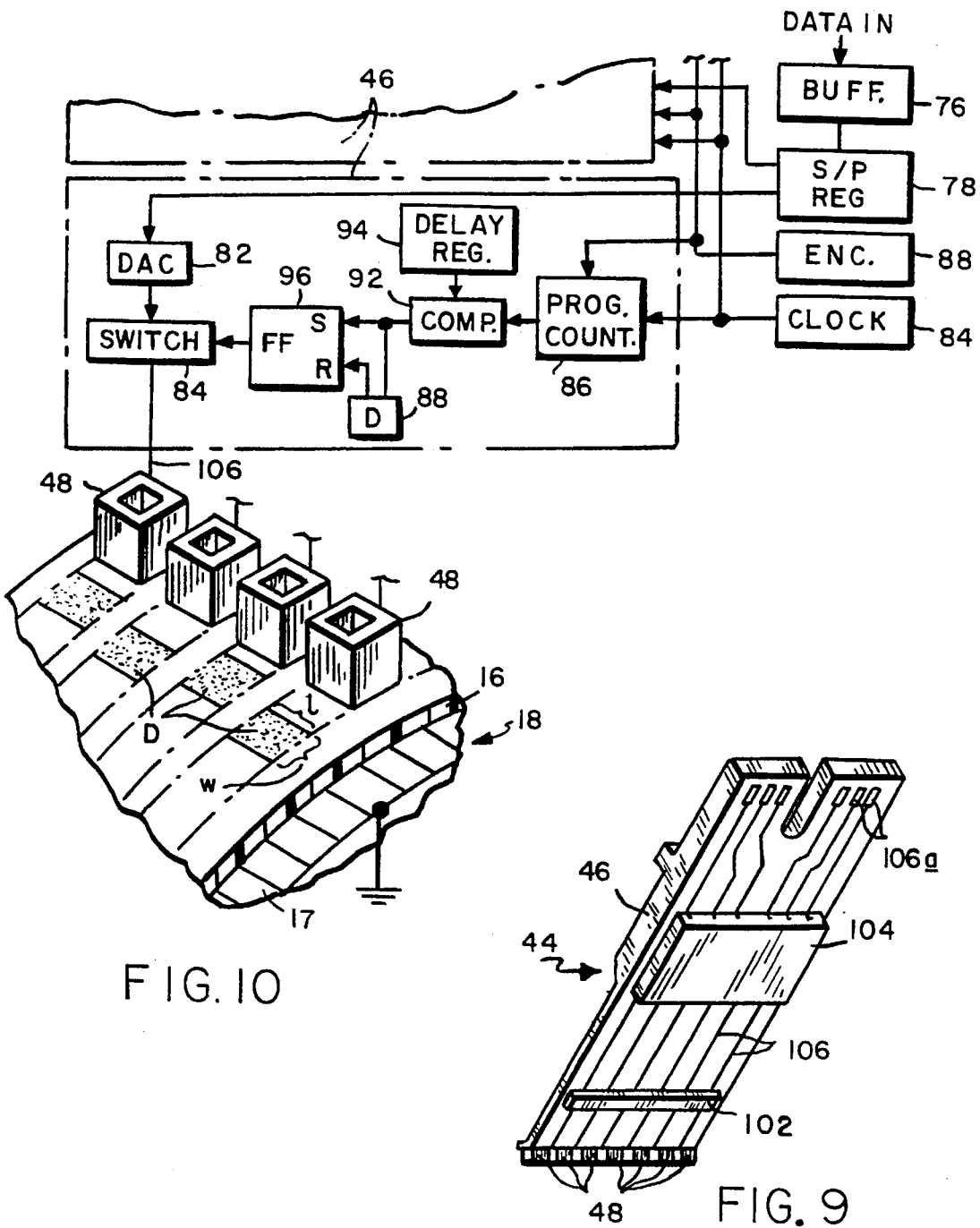
Figure 11:
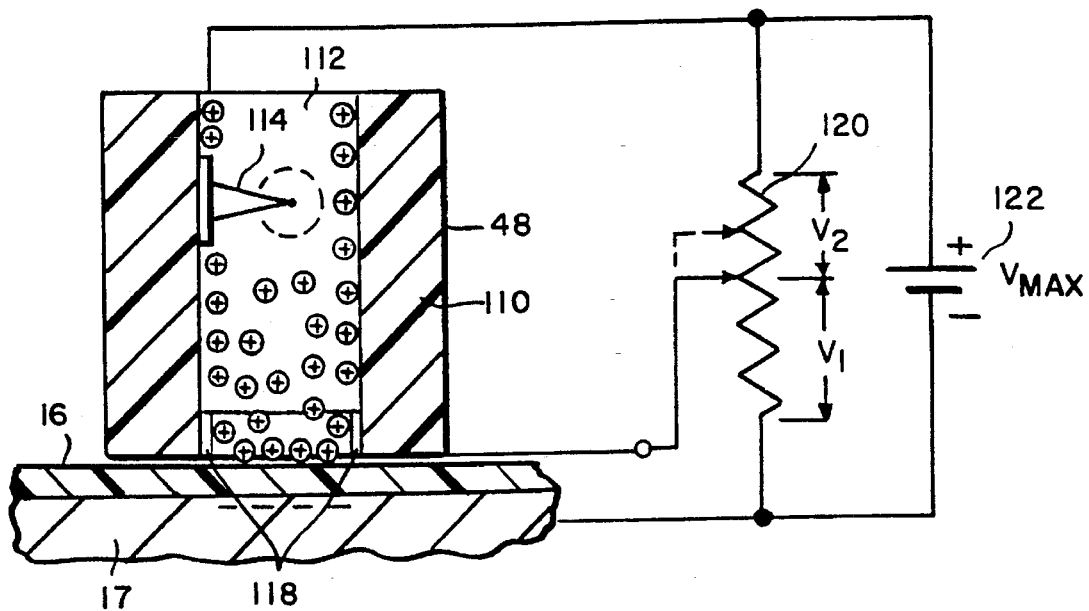
Figure 12:
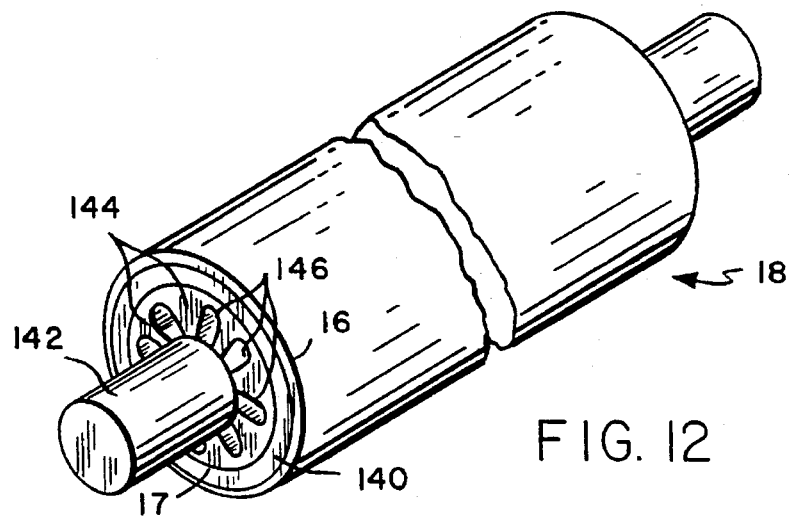

FIG. 4 graphically illustrates the relationship between the observed reflection density of the applied ink and the surface voltage residing on the image cylinder prior to ink release;

FIG. 5A graphically illustrates the internal cohesion profile, as a function of temperature, of a suitable ink;

FIG. 5B is a graphical diagram showing the adhesion of the ink to the image cylinder and the printing substrate at the point of ink transfer;

FIGS. 6A–6C illustrate the use of dither techniques to reduce visual artifacts and the manner in which differently colored print dots maybe superimposed FIGS. 6A and 6B being plan views of printed dot arrays and FIG. 6C illustrating a cross section of the dot array of FIG. 6B;

FIG. 7 is a plan view, with parts broken away, of a print head for imaging the image cylinder shown in FIG. 3;

FIG. 8 is a sectional view taken along line 7—7;

FIG. 9 is an isometric view on a much larger scale showing in greater detail a portion of the head illustrated in FIGS. 7 and 8;

FIG. 10 is a diagrammatic view showing the operation of the print head;

FIG. 11 is a sectional view of a preferred structure for the electrostatic emitter units of the print head;

FIG. 12 is an isometric view of a preferred print-cylinder construction; and

Figure 13:
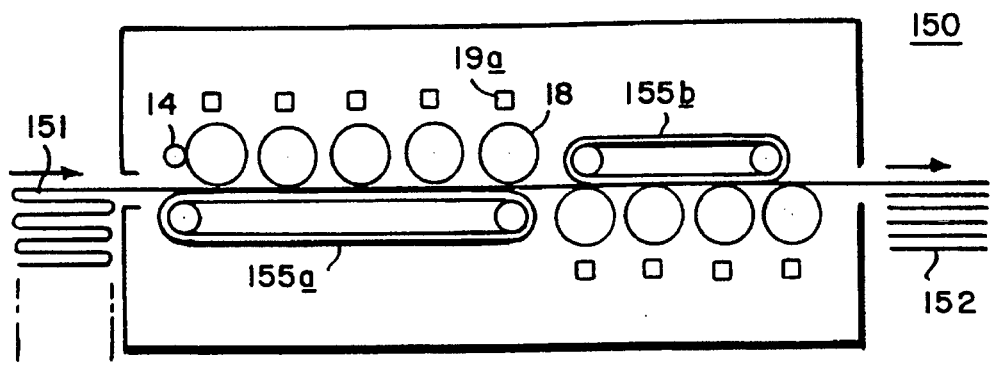

FIG. 13 is a schematic view of a printing/press incorporating the present invention.

C. DETAILED DESCRIPTION OF THE PREFERRED EMBODIMENTS

1. The Printing Ink

The printing inks of the present invention generally comprise two main components, namely, the clear carrier material and the colored pigment particles. The colored particles are colloidally dispersed within the carrier material, and typically comprise about 5–10% of the ink by volume, although in some applications the ratio may be higher. For reasons to be discussed below, the melting point of the carrier material is well below that of the particles.

The advantageous characteristics of the ink of this invention derive from a number of features not offered by any other ink. These features include the formation of stable, non-agglomerating, uniform dispersions of the colored particles within the solid carrier matrix; a precise, repeatable and selectable color purity and brightness for the ink, and exceptionally high transmissivity when the ink is deposited; the ability to impart to each particle a precise, permanent electrical charge that can respond to an externally imposed electrostatic field interactively, together with other particles, while embedded in a dipolar, similarly responsive carrier material to form a matrix capable of responding collectively to an external electrostatic field; and a carrier material having viscoelastic, thermally controlled properties suitable for deposition on a print cylinder and release therefrom to a substrate.

To obtain an ink having the above-mentioned characteristics and functional properties which will operate satisfactorily in the electrothermal print method described herein or in other marking methods that rely on or benefit from (a) the interplay of forces produced by field neutralization, (b) electrostatic adhesion for maintaining the deposition of a "bite" of ink, (c) differential adhesion at the transfer-release point, and (d) internal cohesion of the ink to achieve total ink release, the following materials are employed:

a. A Basic Carrier Material

To create an electrothermally functional printing ink for use in the electronic printing process described herein, one first chooses a suitable carrier material which is optically clear, solid at room temperature (20° C. up to 80° C.), but which enters a glass-transition phase at higher temperatures. Specifically, as shown in FIG. 5, the material preferably turns into soft, pliable plastic between 80° C. and 120° C.

and becomes highly liquid (i.e., exhibits a viscosity of about 20 centistokes, comparable to that of thin oil) at temperatures of 150° C. and higher. In this liquid state, the material responds well to the attraction force exerted by an electrostatic field emanating from a print-form member at field-strength levels of $10^3$–$10^6$ V/cm.

This carrier material should not discolor, shrivel, or emit disagreeable odors below 175° C. and should be reasonably hard at room temperature. In its liquid state and while in contact with a hot (i.e., 150° C. or higher) print member, the carrier should not wet the surface of the print member in the absence of electrostatic attraction. The material also must be a good insulator (e.g., exhibit a volume resistivity of at least $10^{15}$ ohm-cm); possess a molecular structure that is polarizable in an electrostatic field of the above strength; and exhibit a dielectric constant of about 7 in a hot, liquid state, so as to propagate the electrostatic field to the multitude of particles dispersed therein (whose innate charge potentials link them to other particles via the dielectric dipolar molecular structure of the carrier). With these characteristics, the carrier forms a coherent matrix with interspersed color particles that can be removed from a molten reservoir as a "bite" by a passing electrostatic-field site, with the bite being confined substantially to the boundaries of that site, and the size of the bite being determined by the strength of the field at the site.

Preferably, the carrier material also assumes a higher dielectric constant upon melting, thereby assisting formation of a matrix with the particles and enhancing the responsiveness of the particle/carrier matrix to applied electrostatic fields.

A basic carrier material, whose derivatives are described further in copending application Ser. No. 07,792,713, entitled METHOD OF MANUFACTURING SYNTHETIC, MONODISPERSED COLOR PIGMENTS FOR THE COLORATION OF MEDIA INCLUDING PRINTING INKS AND THE PIGMENTS MADE THEREBY (filed contemporaneously herewith and incorporated by reference herein) includes methyl methacrylate (melting point about 150° C. and glass transition at about 80° C.), which can be synthesized with readily available monomers and polymerization initiators according to methods well-characterized in the art; methods of synthesis are also discussed in the above-noted application.

b. Basic Particle Materials

Desirable particle characteristics include structural and colorimetric stability at temperatures up to 175° C.; a melting point above that of the carrier material, and preferably above 250° C.; uniformity of size and shape (preferably spherical with a mean diameter of about 0.1 μm); the ability to carry and retain a net electrical charge; a refractive index nearly identical to that of the carrier material; and, for typical printing applications, the ability to adsorb (or absorb) at its surface a color dye or a mixture of dyes and bond to them with sufficient strength to resist their removal due to exposure to heat or to any solvent needed for the fabrication and dispersion of the particles in the carrier.

Figure 1:
FIG. 1 is an inked reproduction of a microscopic photograph of typical, irregularly shaped and sized conventional color pigments as customarily used in printing inks.
Figure 2:
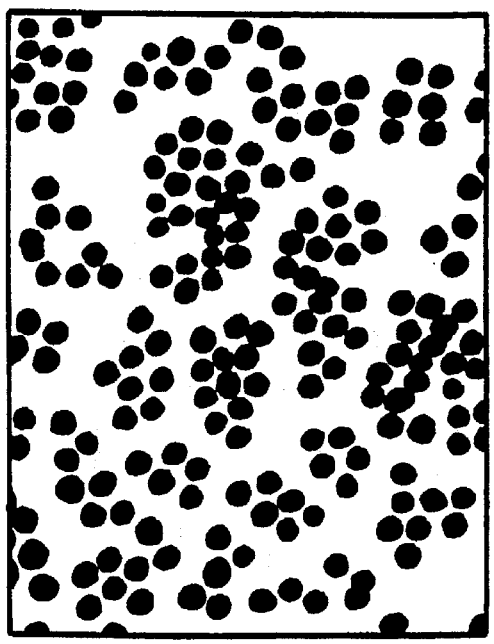
FIG. 2 is an inked reproduction of a microscopic photograph of the color pigments prepared in accordance with the present invention and used as printing ink in the method taught herein, and shown at comparable magnification of 25,000X.

The in situ behavior of the particles of the present invention, as compared with conventional pigment particles, is illustrated in FIGS. 1 and 2. The conventional particles shown in FIG. 1 are irregular and tend to agglomerate. This tendency interferes with the ability to create uniform dispersions of such particles within a carrier, resulting in inks that do not appear particularly bright, and whose colors do not appear pure. Furthermore, because of the random nature of particle agglomeration, it is difficult to create inks having uniform color hues that may be obtained repeatably.

By contrast, the particles of the present invention shown in FIG. 2 are individually uniform microspheres that do not vary substantially in dimension from particle to particle. Furthermore, quantities of such particles can be dispersed uniformly in a carrier to conform to the Mie light-scattering theory, thereby facilitating reproduction of very pure colors on a repeatable basis.

A number of inorganic powders have been found to meet these criteria. We have had particular success with metal oxides, sulfides and phosphates; yttrium and compounds thereof; and silica and silica-like compounds. These materials tend to be obtainable as microspheres having a relatively narrow size distribution; for purposes of the present invention, average diameters of about 0.1 μm are preferred.

Such particles can be produced either by precipitation from homogeneous solutions, or by reactions with aerosols (see, e.g., Matijevic, 15 Annual Review of Materials Science 483 [1985]). For example, uniform spherical colloidal aluminum oxide (see,. e.g., Brace & Matijevic, 35 Journal of Inorganic and Nuclear-Chemistry 3691 [1973]), chromium oxide (see, e.g., Demchak and Matijevic, 31 Journal of Colloid and Interface Science 259 [1969]), and hematite, $\alpha$-$Fe_2O_3$ (see, e.g., Matijevic & Scheiner, 63 Journal of Colloid and Interface Science 509 [1978]) have each been prepared by homogeneous precipitation from the corresponding salt solutions using forced hydrolysis. Spherical colloidal cadmium sulfide (see, e.g., Matijevic & Wilhelmy, 86 Journal of Colloid and Interface Science 476 [1982]) and zinc sulfide (see, e.g., Wilhelmy & Matijevic, 80 Journal of the Chemical Society (Faraday Transactions I) 563 [1984]) were each obtained by reacting the respective metal solutions with thioacetamide.

The aerosol procedure involves interaction between droplets of one reactant (such as a metal alkoxide) with the vapor of a co-reactant (such as water) to yield spherical particles of predetermined composition. It is also possible to control particle size by adjusting the flow rate, process temperature and process time. For example, titanium dioxide (see, e.g., Visca & Matijevic, 68 Journal of Colloid and Interface Science 308 [1979]) and aluminum oxide (Bee, e.g., Ingebrethsen & Matijevic, 11 Journal of Aerosol Science 271 [1980]) have each been obtained using an aerosol generator.

A preferred method of producing monodispersed particles of silica ($SiO_2$) is described in the above-noted application entitled METHOD OF MANUFACTURING SYNTHETIC, MONODISPERSED COLOR PIGMENTS FOR THE COLORATION OF MEDIA INCLUDING PRINTING INKS AND THE PIGMENTS MADE THEREBY.

c. Preparation of the Inks

After isolation, the particles are surface treated to assure ionic bonding from the particle core to the cationic color dye adsorbed on the particle surface. A process of producing colored particles of aluminum hydroxide is described in Tentorio, Matijevic & Kratohvil, 77 Journal of Colloid and Interface Science 418 (1980); a preferred technique for preparing silica particles is described in the just-mentioned copending application. The dye can be formulated to produce visible colors, or to absorb particular frequencies of electromagnetic radiation (e.g., ultraviolet and/or actinic radiation). Furthermore, more than one dye can be applied to each particle, thereby facilitating preparation of inks having desired color hues without the traditional need to mix varying quantities of single-hue particles.

A charge is then placed on the particles by the addition of trace elements of any of a variety of charge-control agents and according to any of the techniques known to practitioners in the art, and the particles are then dried and retrieved as a particulate powder. The powder is mixed in a selected volumetric ratio with a suitable carrier material, which can be introduced into the plastic powder of the carrier matrix and subsequently melted into the carrier as a bulk volume, or ultrasonically dispersed in the carrier monomer prior to polymerization. Together, they form the ink of the present invention.

2. Electronic Printing Apparatus and Method

Refer now to FIG. 3, which schematically illustrates a preferred printing apparatus that can be employed in conjunction with the inks of the present invention. Marking of a printing substrate 10 (which can be, e.g., paper) is achieved in two transfer steps: the transfer of ink from an ink-supply roller 14 to the surface of a heated image cylinder 18, and the subsequent transfer of this ink (shown at reference numeral 12a) onto the substrate 10.

First, an imagewise dot pattern consisting of electronic or preferably ionic charges having varying-intensities is recorded onto the dielectric surface 16 of image cylinder 18 or to a plate or other shaped member by an electronic writing head 19a. The diameter of cylinder 18 may be on the order of four inches, and its surface 16 may be a thin (e.g., 1 µm) layer of sapphire ($Al_2O_3$), silicon nitride, diamond or other hard, highly resistive material. Underlying surface 16 is a conductive layer 17.

Writing head 19a, which will be described in more detail in connection with FIGS. 7 through 10, possesses a large number of field-emission electrode tips whose current flow is digitally controlled by a controller 19b, which includes an image-recording computer. Controller 19b causes writing head 19a to continually lay down a dot charge pattern of imagewise information onto surface 16. The resulting latent image consists of a raster-dot pattern of charge areas 20 that collectively represent the areas of the image that will receive ink, leaving a complementary pattern of uncharged areas 22.

A suitable image-recording computer and press-control system is described in U.S. Pat. No. 4,792,860, the disclosure of which is hereby incorporated by reference. This and other useful systems process text and graphic data into rasterized digital patterns, which are transmitted to a controller as a data stream. The controller operates an electrostatic discharge device (such as writing head which overlies a printing surface and deposits charge dots at locations dictated by the rasterized image data.

As the surface 16 of charged image cylinder 18 rotates in contact with the surface 12 of ink-supply roller 14 (at essentially equal surface velocities), the charged areas 20 attract, via their respective outreaching electrostatic fields, the molten ink thereto; conversely, the angle of contact (approximately 90°) between the molten ink and the hot cylinder surface 16 is innately maintained such that ink does not transfer spontaneously to uncharged areas 22. This condition is maintained by choosing a mildly ink-repellent or ion-implanted material for surface 16. Both the ink and the cylinder surface are kept at relatively high temperatures, usually about 150° C., during the printing process so that the ink remains in a low-viscosity molten state, as illustrated in FIG. 5.

During this transfer step, it is both the dielectric carrier material and the charged particles (which are attracted as a composite liquid matrix to charge areas 20) that serve as the transport agent. That is, in the presence of the field at each spot, the molecular structure of the carrier forms chains of dipoles oriented along the field lines. These dipoles interact with the charges on the particles so that those charges reorient to accommodate to the polarity of the field lines. In other words, if there is a positive ionic charge of the surface of the image cylinder, the carrier dipoles orient themselves along the field lines to present their negative poles to the cylinder surface. The particles dispersed in the carrier likewise become polarized to conform to and propagate the field pattern, thereby becoming electrostatically bound to the carrier so that the carrier and particles transfer together in a fixed ratio to the cylinder surface.

The volume (i.e., depth, which translates into thickness on surface 16) of the matrix that is attracted to a particular latent-image spot or dot on image-cylinder surface 16 depends on the magnitude of the electrostatic field strength at that spot. In other words, the principle of physics at work is not charge compensation, but rather field neutralization through an interacting matrix of particles and carrier material. This ability to produce different thicknesses of ink deposits within the boundaries of each image dot by varying the field intensity of each dot facilitates the generation of a gray scale for each dot, ranging from zero to 2.0 reflection density; this capability, illustrated in FIG. 4, approximates/ that of silver-based photographic film.

Because of the dipolar affinity that exists between the particles and the carrier material, a fixed amount of carrier accompanies each particle as the ink is deposited onto surface 16, thereby also preserving, without depletion, the two components in the same ratio within the ink remaining on ink-supply roller 14. The cohesion of the carrier material and its surface tension also facilitate the regeneration of a smooth layer of ink at the surface 12 of ink-supply roller 14 after a droplet of ink is withdrawn from surface 12, as these forces within the molten ink combine to close in and fill the void in the body of ink remaining on the roller 14. It is also important that the image-cylinder surface 16 exhibit high planar-surface resistivity (at least $10^{18}$ ohm/square) to prevent the migration and spreading of the latent image.

The second transfer step involves application of the molten ink 12a on the image-cylinder surface 16 to the substrate 10, which is mildly pressed against surface 16 by a roller platen 24, to form the image pattern 12b. During this step, the carrier material serves as the transport agent to effect transfer of the ink 12a to substrate 10. Unlike surfaces 12 and 16, substrate 10 is not heated, and remains generally at room temperature.

As noted above, it is critical that the ink carrier material have a relatively sudden transition from solid to a glassy phase as the temperature rises from, for example, 80° C. to 120° C., with a low-viscosity liquid state being reached at 150° C. A representative profile of a suitable carrier, in which internal cohesion is plotted against temperature, is illustrated in FIG. 5A. The sharp phase transition causes the internal cohesion of the molten ink carrier material to increase rapidly when the ink comes into contact with the cool printing substrate 10; this cohesion combines with the differential release force that is exerted by the greater adhesion of the ink to the substrate 10 as compared with the relatively weak adhesion of the ink to the surface 16 to effect the complete withdrawal of all ink from surface 16.

It should be understood that the ink at each dot position may not solidify throughout instantaneously; the rate of solidification depends on the size of the ink "bite" at that image dot. For example, if the amount of ink adhering to a particular image dot on the print cylinder is relatively small (i.e., it corresponds to the low end of the gray scale), as soon as that "thin" ink spot is brought into contact with the printing substrate, it will cool and solidify throughout its entire thickness, and will thus offset completely from the print cylinder 18 to the substrate 10 as it leaves the nip between the cylinder and the substrate.

However, if a relatively large amount of ink is present at a given image dot on the cylinder, only the surface of that ink spot will solidify upon contact with the cool substrate 10. A thermal gradient will exist in the ink spot varying from near 80° C. adjacent the substrate surface to near 150° C. close to the substrate surface. This means that the internal cohesion of the ink carrier, $F_c$, will vary throughout the thickness of the ink spot.

Accordingly, for complete transfer of ink from the cylinder to the substrate, it is critical that at the point of transfer, the cohesion force $F_c$ equal or exceed the difference between the adhesion force, $F_A$, that adheres the ink to the substrate and the electrostatic force, $F_E$, that adheres the ink to the cylinder for all ink-spot thicknesses corresponding to the full gray scale being printed. This relationship is illustrated graphically in FIG. 5B. These characteristics of the ink, the image cylinder and the substrate assure that ink deposits having different thicknesses will be plastic or compliant enough to accommodate the change in the spacing of the moving cylinder and substrate surfaces that occur during ink transfer, yet cohesive enough to offset completely to the substrate.

The rapid solidification of the ink 12a that contacts substrate 10 also sharply Limits the possibility that freshly deposited ink 12b will smear, and also reduces the chances that ink 12b will penetrate the entire thickness of (i.e., "print through") the substrate 10.

It is, of course, desirable to expand the foregoing printing process to achieve multiple-color printing. This is accomplished by overprinting multiple, geometrically congruent dots of successive, subtractive colors of various individual densities to achieve subtractive optical interaction; by using this technique, we have obtained results comparable to photographic-emulsion imagery in terms of color quality, dynamic range and resolution. During each overprint step, the previous ink dots that have already solidified on the substrate 10 may be briefly remelted at their surfaces so as to better accept by fusion the next layer of molten ink.

The inkdots maybe laid down side by side as shown in FIG. 6A. Alternatively, to avoid Moiré patterns and other visual artifacts generated by the periodicity of the raster position of the dot matrix, the dot locations may be slightly offset by electronic delays during the recording cycle to effectuate a deliberate randomness in, and overlapping of, the dot positions, including those color dots which are superimposed on other dots This "dither", depicted in FIGS. 6B and 6C, also aids in reducing the number of gray levels needed for each dot in order to maintain a desired gray scale, and thus facilitates data compression. If subtractive color dots are being printed, the dither tends to soften the colors and smooth out the boundaries between different colors, which is desirable in some printing applications.

If desired (e.g., for ecological reasons such as recycling of the printing substrate), at a later point in time the ink can be removed from the substrate 10 by heating the surface of the substrate and running a hot roller over the printed face while applying a strong electrostatic field thereto; this results in withdrawal of the printing ink and breakage of the bond between the ink and the paper surface, as the ink is drawn to the polymerphilic roller surface from which it can later be removed mechanically (e.g., by scraping). Suitable equipment for performing this operation is shown schematically in FIG. 3, where reference numeral 30 denotes a source of heat and numeral 32 a hot roller.

Because the ink of the present invention exists in solid form at room temperature, the likelihood of environmental contamination is eliminated. The added ability to reclaim both the printing substrate for recycling and the ink results in substantial environmental benefits.

Referring now to FIGS. 7 and 8, the illustrated head 19a comprises a stationary elongated support beam 42 spaced opposite and parallel to cylinder 18. Adjustably mounted to beam 42 is a series of emitter units 44 whose combined length is comparable to that of the cylinder. For ease of installation and to maximize the footprint available for the emitter units, those units may be adjustably mounted to bar 42 in two rows, with the units of the two rows facing toward one another as best seen in FIG. 7.

As shown in FIGS. 8 and 9, each emitter unit 44 comprises a generally rectangular, tongue-like insulating substrate or plate 46, e.g., of pressure-melt glass. Present at the underside of each substrate 46 is a plurality of tiny field-emission electrodes or electron emitters 48 whose edges project slightly from the substrate. Emitters 48 are spaced apart across one end of the substrate in a straight line. For ease of illustration, we have shown each emitter unit 44 as containing only a relatively few emitters 48. In actuality, a typical unit 44, 10 centimeters wide, may contain as many as 1000 emitters 48, each emitter being in the order of 12.8 mm wide and 40 mm long. As will be described in detail later, the circuitry for servicing the emitters of each emitter unit 44 may be mounted directly on the unit's substrate 46.

The substrate 46 of each emitter unit 44 is formed with a lateral rib 52 on its upper surface which is arranged to slidably and/or pivotally engage a longitudinal channel 54 in the underside of beam 42, there being one such channel 54 on each side of the beam. These channels constitute precision guideways which fix the distance of the emitter units 44 from the print cylinder 18. Also, each emitter substrate 46 has a longitudinal slot 56 extending in from the end of the substrate remote from the emitters. After an emitter unit is slidably engaged to the beam 42 as shown in FIGS. 7 and 8, it may be adjustably secured to the beam by a threaded fastener 58 extending through the slot 56 and a registering hole 62 in the beam, and threaded into a nut 64 at the upper surface of the beam.

Preferably, each fastener 58 has an eccentric neck 58a (FIG. 8) which fits snugly in the slot of the corresponding unit 44 so that by turning the fastener, the unit may be shifted to some extent in either direction along the beam. This adjustment may be used to align the various emitter units with the print cylinder as will be described in detail later. Once in the proper position, each unit 44 may be locked in place by tightening the corresponding nut 64.

Referring to FIG. 8, beam 42 is provided with a pair of flanges 68 which extend down at opposite sides of the beam. Supported from these flanges is a pair of flexible blades 72, each of which extends down far enough to just wipe the surface of the print cylinder 18. Preferably, the blades clip onto the flanges 68 so that they can be removed easily to gain access to emitter units 44. The purpose of the blades is provide a confined space around the emitter units 44 for the circulation of a gas to cool units 16 and the circuitry thereon. Preferably, the gas is an inert gas such as helium or argon to minimize both ionization of the atmosphere surrounding emitters 48 when the print head is in operation and formation of such harmful compounds as nitric acid from the oxidation of nitrogen.

A preferred configuration for the emitters is illustrated in FIG. 11. As shown therein, each emitter 48 includes a hollow, insulating rectangular body 110 that defines a gas tunnel 112. At least one needle electrode 114 is disposed on a wall of tunnel 112 and points toward the opposite wall. Emitter 48 is oriented with respect to the cylinder so that tunnel 112 extends radially toward dielectric surface 16, facilitating function as a microscopic chimney.

In operation, the emitter is activated by application of a (preferably positive) voltage pulse to electrode 114 of sufficient magnitude (e.g., about 400 volts DC) to cause breakdown to occur. This pulse is applied by a power supply 122. During breakdown, virtually all gas molecules in the proximity of electrode 114 lose at least one electron under the influence of the immensely strong electrostatic field; these electrons are absorbed by electrode 114, causing a tiny halo of resonating ions and free electrons to swirl around each such electrode with intense energy. The ionic species tend to migrate away from electrode 114 to the lower electrical potential at the bottom of tunnel 112 where they encounter and are neutralized by the prevailing current of a metallic wraparound electrode 118, which extends around the interior surface of body 110.

As the ions flow toward electrode 118, they are attracted by the negatively charged conductive layer 17 of the print cylinder. The potential Of layer 17 is more negative with respect to positive electrode 112 than is wraparound electrode 118, and therefore attracts the positive ions more strongly. The necessary potential difference can be created, for example, using the simple circuitry illustrated in FIG. 11. Specifically, a variable resistor 120 limits the voltage $V_2$ from power supply 122 that reaches electrode 118, but does not so limit the voltage applied to conductive layer 17.

The arriving ions accumulate on dielectric surface 16 until they reach a voltage potential equal to that of wraparound electrode 118 (higher local potentials simply result in current backflow into electrode 118, a condition which prevents their persistence). Therefore, the voltage applied to electrode 118 is used to modulate the amount of charge deposited on the print cylinder, and maintain precise control of the dielectric coulombic charge density (Q=VC).

The tunnel cross-section represents the dimension of a print dot. Thus, an array of tunnels along the longitudinal axis of the print cylinder, each with individual control electrodes, facilitates deposition of dot-size charge domains, each having an individual coulombic charge density as controlled by the voltages of the wraparound electrodes associated with each tunnel. These levels may be set digitally, so that individual emitters are separately activated and controlled to produce imagewise patterns of charge on the print-cylinder surface 16.

In order to create stable reference conditions, needle electrode 114 may be maintained at a "burn-in" potential which always causes a tiny electrical standby current to flow, thus preventing buildup of harmful chemical deposits on the surface of electrode 114.

The tunnel arrays are preferably fabricated by etching numerous parallel chimney-like grooves in a plate of insulating material. The lower end of each of the grooves is then provided, using suitable means such as vapor deposition or ion implantation, with a conductive band that serves as electrode 118. Some form of external access to this electrode (e.g., via a channel extending through the insulating material) is provided thereto in order to facilitate its electrical connection to external circuitry.

When the plate containing the grooves is placed against a second, similar plate so that the grooves align with one another, an array assembly of self-contained tunnels is formed which can be positioned adjacent the dielectric print-cylinder surface 16. By offsetting array assemblies at half-pitch, two parallel arrays can cover the odd and even dot positions along the cylinder surface without causing detrimental separation spaces between the dots as they are charging the surface in coherent rows. These rows are made linear through delay-firing circuitry (which also can introduce the positional "dither" discussed above).

The control circuitry shown in FIG. 11 can set the potential of the electrodes in each emitter 48 to any of a plurality of levels. For example, the ability to control each emitter 48 to deposit any of 32 charge densities results in the ability to create any of 32 possible field densities at each print-dot location on the cylinder surface 16, with such fields reaching into the molten, electrostatically responsive ink to capture field-intensity-proportional amounts (i.e., thicknesses) of ink.

Various circuits known in the art may be used to control the operation of entire arrays of emitters in accordance with an incoming data stream. Once such arrangement is shown in. FIG. 10. The image data arriving on a high-speed data line from a mass memory in controller 19b may be applied by way of a buffer memory 76 to a serial-to-parallel shift register 78, which distributes the data to similar circuitry carried by the various emitter units 44. The circuit components on each unit serve all of the emitters on that unit. Such circuitry may include a digital-to-analog converter (DAC) 82 for each emitter 48. The output of the DAC is applied to the corresponding emitter by way of a switch 84.

Switch 84 is turned on and off at the appropriate times to enable emitter 48 to lay down an image area or dot D of a selected width at a selected location around the print cylinder 18. For this, a master clock 84 that serves all units 44 and which may be in controller 19b applies clock signals to a counter 86 on each unit. Counter 86 commences counting when it receives a signal from a shaft encoder 78 (FIG. 7) rotated by cylinder 18, which itself rotates at a selected fixed speed. The signal from shaft encoder 78 signifies that the cylinder is at a selected phase angle, e.g., 0°. Counter 86 thus emits an output pulse to closet he corresponding switch 84 when it reaches a selected count corresponding to the cylinder phase angle at which emitter 48 is to apply an image dot D to the cylinder.

To allow the position of the image dot D to be adjusted around the cylinder to some extent for alignment purposes, the signal from counter 86 may be applied to a comparator 92 which also receives the contents of a register 94. Comparator 92 issues an output signal when the number in counter 86 equals that in register 94. Changing the number in the register shifts, around the circumference of the cylinder, the leading edge of the image dot D produced by that emitter 48. This is the left edge as viewed in FIG. 10.

The output of comparator 92 is applied to the set (S) input of a flip flop 96 and, via a delay 98, to the reset (R) input of the same flip flop so that the flip flop provides, to switch 84, an actuating signal of a fixed duration that determines the width (w) of the image dot D laid down by emitter 48. The length (l) of the image dot is determined by the length of the emitter.

For ease of illustration, the various timing and reset signals to synchronize the elements of the circuit in FIG. 10 have not been shown. They may be produced in any one of a number of ways known to those skilled in the art.

The DAC 82, switches 84 and other components serving the emitters 48 on each emitter unit 46 can be in the form of integrated circuits mounted to substrate 48 as shown at 102 and 104 in FIG. 9. Also, the electrical leads 106 connecting those circuits and emitters 48 may be printed on the substrate. Terminals 106a at the upper ends of the emitter units may be connected by jumpers 108 (FIG. 8) to the other circuit components such as buffer 76 and register 78 that serve all of the emitter units. These other components may be contained on one or more printed circuit boards 110 mounted to the top of beam 42 as shown in FIG. 8. A cover 112 having depending side walls which clip onto the sides of beam 42 may be provided to enclose the printed circuit boards 110.

The positions of the image dots D along the cylinder 18 is determined by the spacings of the emitters 48 on the emitter unit 44 and the positioning of those units along beam 42. The spacing of the individual emitters on each unit 42 may be closely controlled at the factory. To enable precise positioning of the units 44 along beam 42, lateral grating lines 116 (FIG. 7) may be provided on a glass bar 118 mounted to the underside of beam 42 as shown in FIG. 8. The grating lines are spaced apart the same distance as the emitters 48 and they should be present at least near the boundaries of adjacent emitter units 44 so that the spacing of the endmost emitters 48 on adjacent emitter units may be adjusted to equal the spacing of the emitters on each unit 44.

To position units 44, the print head 19a is placed over a precision guideway (not shown) which carries a traveling microscope shown in phantom at 118 in FIG. 8. Microscope 118 can be moved along the guideway under beam 42 from unit to unit, allowing an operator to sight between the two rows of emitter units 44 and align the endmost emitters 48 of adjacent emitter units with adjacent grating lines 116.

Thus, the emitters essentially address the small image areas or dots D on the surface layer of the print cylinder. That layer accepts and sustains a high-resolution pattern of essentially contiguous electrostatic field domains of differing intensities corresponding to the original image. As described above, during printing, these variably charged image areas D attract our special ink in precise bites whose sizes just compensate or neutralize the fields in those areas. Removal of the ink also results in elimination of the charges associated with it. Preferably, means are provided for removing the electrical charges on the print cylinder 18 to erase the image thereon. In the illustrated system, this is accomplished by the ultraviolet lamp 122 shown in FIG. 8 which renders the printing cylinder's surface layer conductive.

A preferred construction of printing cylinder 18 is shown in FIG. 12. In this embodiment, the cylinder 18 includes a dielectric surface layer 18 which overlies a conductive metal sleeve 17. The cylinder is lined with an elastic insulating layer 140, which preferably contains means for heating the cylinder (or is formed of a resistive rubber for this purpose). A shaft 142 extends through cylinder 18 and is mounted to a cooling member 144 on each side of cylinder 18. The ends of shaft 142 are journaled into opposite sides of the machine frame of a printing press. Cooling members 144 act as end plates, and are firmly secured to the cylinder body. They contain a series of openings which allow air to circulate through the interior of cylinder 18. An external source of air can be directed toward one of the cooling members to enhance circulation.

Implementation of the foregoing elements on a printing press is shown schematically in FIG. 13. The press, indicated generally at 150, includes a series of printing stations 65 each including a print cylinder 18, a writing head 19a and an ink-supply roller 14 (only one of which is shown for simplicity); not shown are the standard guide, paper transport and drive components ordinarily associated with such equipment. The orientation of some of the print stations is inverted with respect to the others to allow for double-sided printing. A printing substrate, such as a web 151, enters press 150 and is conveyed across each of the print stations by two belts 155a and 155b. The web is cut as it emerges after traversing all of the print stations, and the cut sheets are stacked as indicated at 152.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed. For example, it is possible to dispense with the pigment particles by dispersing within the carrier a volume of organic color dye having a selected light absorptivity and transmissivity that confers desired spectral characteristics to the carrier.

What is claimed is:

1. An electronic printing press comprising:
   a. a plurality of print stations, each capable of applying ink of a selected color to a printing substrate;
   b. means for advancing the substrate to successively encounter each print station such that ink is applied on top of ink applied by each other print station;
   c. wherein such printing station comprises:
   1) a generally cylindrical image member having an exterior surface for receiving ink, said image member including
      a generally cylindrical rigid body having a shaft extending therefrom,
      a thermally and electrically insulating elastic member encasing the body,
      a metallic sleeve tightly surrounding the insulating member,
   a hard, highly dielectric surface of high surface resistivity surrounding said sleeve constituting the exterior surface of the image member, the dielectric surface being thin and flexible and exhibiting a smoothness and surface-energy characteristics to readily release ionic charges in conjunction with a removal of said printing ink therefrom;
   2) a writing head disposed exteriorly of said image member and comprising an array of field-emission ionization electrode structures disposed coaxially and in full length proximate to the image member, each electrode structure being spaced a predetermined distance opposite the exterior surface of the image member, and
   3) an ink source with an outer surface carrying a layer of liquid ink and moving in unison with the exterior surface of the image member, said ink source and said image member being placed in close proximity to one another to form a nip that can be filled with said ink to form an active reservoir space from which said ink can be extracted.

2. The printing press of claim 1 wherein the field-emission electrode structures each comprise:
   a. a chimney-like microtunnel, fabricated from an insulating material, having an interior surface and disposed radially above the surface of the image member such that an open end of the microtunnel faces the image member;
   b. an electrode mounted within the microtunnel and connected to an electrical power supply; and c. a conductive band extending around the inner surface of the microtunnel and in close proximity to the open end of the microtunnel facing the image member, the band being connected to a voltage-control circuit that facilitates application of a first voltage to the band and a second voltage to the image member, and respective adjustment of these voltages.

3. The apparatus of claim 1 wherein the liquid ink comprises:

a. a colorless carrier material comprising an electrostatically polarizable polymeric substance which is responsive to an externally imposed electrostatic field, and b. colored, non-melting, evenly dispersed fine particles of composite structure and of colloidal dimensions, whose size, shape, and compositional chemistry are substantially identical and conform to predetermined values, the particles being adhesively integrated in the carrier material to form an interactive matrix therewith.

4. The apparatus of claim 1 wherein the writing head is capable of continuously applying new imagewise electrostatic charges onto said image member during transfer of the ink to said image member according to previously applied charges.

5. The apparatus of claim 3 wherein the carrier material is solid or quasi-solid at temperatures below 80° C., becomes pliable at temperatures between 80° C. and 150° C., and enters a liquid melt phase at temperatures above 150° C., and further wherein the predetermined temperature is at least 150° C.

6. The apparatus of claim 3 wherein the carrier material is a thermoplastic polymer selected from the group consisting of polymethylmethacrylate, polystyrene, polystyrene/polymethylmethacrylate copolymer, polymethylmethacrylate/polybutylmethacrylate copolymer, and polybutylmethacrylate/polystyrene copolymer.

7. The apparatus of claim 3 wherein at least one dye is adsorbed or absorbed into the ink particles.

8. The apparatus of claim 1 further comprising alignment means associated with the electrode structures for aligning the structures with the image member.

9. The apparatus of claim 1 wherein each electrode structure comprises:

a. a hollow, insulating rectangular body that defines a gas tunnel; and b. disposed therein, at least one needle electrode.

10. The apparatus of claim 1 further comprising an electrical power supply coupled to each electrode structure and capable of selectably applying voltage pulses thereto, the voltage pulses being of sufficient magnitude to cause breakdown.

11. The apparatus of claim 10 further comprising control circuitry for controlling the magnitudes of the voltage pulses.

12. The apparatus of claim 10 further comprising control circuitry for selectably actuating the electrode structures to form an imagewise charge pattern on the image member.

13. The apparatus of claim 10 further comprising means for removing electrical charges from the image member.

14. The apparatus of claim 13 wherein the charge-removal means is a source of ultraviolet radiation.

* * * * *